United States Patent
Mou

(10) Patent No.: US 11,332,634 B2
(45) Date of Patent: May 17, 2022

(54) COMPOSITION FOR OVERCOAT LAYER, PREPARATION METHOD FOR THE SAME, OVERCOAT LAYER MATERIAL, DISPLAY SUBSTRATE AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventor: Guangying Mou, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 670 days.

(21) Appl. No.: 16/304,749

(22) PCT Filed: May 30, 2018

(86) PCT No.: PCT/CN2018/089026
§ 371 (c)(1),
(2) Date: Nov. 27, 2018

(87) PCT Pub. No.: WO2019/041923
PCT Pub. Date: Mar. 7, 2019

(65) Prior Publication Data
US 2021/0222026 A1    Jul. 22, 2021

(30) Foreign Application Priority Data
Aug. 30, 2017    (CN) .......................... 201710762111.X

(51) Int. Cl.
*C09D 125/14* (2006.01)
*C09D 163/00* (2006.01)
(Continued)

(52) U.S. Cl.
CPC .......... *C09D 125/14* (2013.01); *C08K 5/0025* (2013.01); *C08K 5/01* (2013.01);
(Continued)

(58) Field of Classification Search
CPC .......... C08L 63/00; C08L 33/12; C08L 25/04; C08L 25/06; C08L 25/08; C08L 2203/20;
(Continued)

(56) References Cited

U.S. PATENT DOCUMENTS 4,522,962 A * 6/1985 Abbey ...................... C08F 2/22
523/404
5,252,637 A * 10/1993 Craun .................. C08G 59/066
523/406
(Continued)

FOREIGN PATENT DOCUMENTS

CN    1898291 A    1/2007
CN    101825843 A    9/2010
(Continued)

OTHER PUBLICATIONS

WO-2005108458-A1, Nov. 2005, Machine translation (Year: 2005).*
(Continued)

*Primary Examiner* — Satya B Sastri
(74) *Attorney, Agent, or Firm* — Brooks Kushman P.C.

(57) ABSTRACT

The present disclosure relates to the field of display, in particular to a composition for an overcoat layer, a preparation method for the same, an overcoat layer material, and a display substrate and a display device including the overcoat layer material. The composition for the overcoat layer comprises: 10 to 30% by weight of styrene, 10 to 30% by weight of an epoxy resin, 1 to 3% by weight of a crosslinking agent, 0.1 to 0.5% by weight of a photoinitiator and/or a thermal initiator, 1 to 3% by weight of a surfactant, and 40 to 77% by weight of a solvent. The composition for
(Continued)

mixing 10 to 30 % by weight of styrene, 10 to 30 % by weight of an epoxy resin, 1 to 3 % by weight of a crosslinking agent, 0.1 to 0.5 % by weight of a photoinitiator and/or a thermal initiator, 1 to 3 % by weight of a surfactant, and 40 to 77 % by weight of a solvent.

obtain the composition for the overcoat layer.

the overcoat layer has styrene as a main monomer component, and may be initiated to cure by an initiator to obtain the overcoat layer material.

20 Claims, 1 Drawing Sheet

(51) Int. Cl.
*C08K 5/00* (2006.01)
*C08K 5/06* (2006.01)
*C08K 5/25* (2006.01)
*C08K 5/04* (2006.01)
*C08K 5/52* (2006.01)
*C08K 5/01* (2006.01)
*G02F 1/1335* (2006.01)

(52) U.S. Cl.
CPC ............... *C08K 5/04* (2013.01); *C08K 5/06* (2013.01); *C08K 5/25* (2013.01); *C08K 5/52* (2013.01); *C09D 163/00* (2013.01); *G02F 1/133519* (2021.01)

(58) Field of Classification Search
CPC .. C09D 163/00; C09D 125/14; C09D 125/06; C08F 220/14; C08F 112/08; C08F 212/08; G02F 1/133519; C08K 5/01; C08K 5/04; C08K 5/06; C08K 5/25; C08K 5/52; C08K 5/0025
See application file for complete search history.

(56) References Cited

U.S. PATENT DOCUMENTS

| | | | |
|---|---|---|---|
| 5,364,910 A | | 11/1994 | Takinishi et al. |
| 5,389,703 A | * | 2/1995 | Lee .................. C08F 283/10 523/406 |
| 2006/0229376 A1 | | 10/2006 | Hayashi et al. |
| 2010/0222473 A1 | | 9/2010 | Youn et al. |
| 2012/0068292 A1 | * | 3/2012 | Ikeda .................. G03F 7/029 257/432 |
| 2015/0030843 A1 | | 1/2015 | Yang et al. |
| 2017/0261806 A1 | | 9/2017 | Niu et al. |

FOREIGN PATENT DOCUMENTS

| | | | | |
|---|---|---|---|---|
| CN | 102372887 A | 3/2012 | | |
| CN | 103360857 A | 10/2013 | | |
| CN | 105182594 A | 12/2015 | | |
| JP | 2006126872 A | 5/2006 | | |
| JP | 2008258203 A | 10/2008 | | |
| TW | 200815485 A | 4/2008 | | |
| WO | WO-2005108458 A1 | * | 11/2005 | .......... H01L 23/293 |
| WO | WO-2013067947 A1 | * | 5/2013 | .............. C08L 75/16 |

OTHER PUBLICATIONS

Second Office Action for Chinese Application No. 201710762111. X, dated Jun. 28, 2020, 11 Pages.
International Search Report and Written Opinion for Application No. PCT/CN2018/089026, dated Aug. 31, 2018, 9 Pages.

* cited by examiner

COMPOSITION FOR OVERCOAT LAYER, PREPARATION METHOD FOR THE SAME, OVERCOAT LAYER MATERIAL, DISPLAY SUBSTRATE AND DISPLAY DEVICE

CROSS-REFERENCE TO RELATED APPLICATION APPLICATIONS

This application is the U.S. national phase of PCT Application No. PCT/CN2018/089026 filed on May 30, 2018, which claims priority to Chinese Patent Application No. 201710762111.X filed on Aug. 30, 2017, which are incorporated herein by reference in their entireties.

TECHNICAL FIELD

The present disclosure relates to the field of display, in particular to a composition for an overcoat layer, a preparation method for the same, an overcoat layer material, a display substrate and a display device.

BACKGROUND

A main structure of a thin film transistor liquid crystal display (TFT-LCD) includes an array substrate and a color filter substrate (CF) that are oppositely arranged to form a cell.

The color film substrate mainly includes: a glass substrate, a black matrix (BM), an RGB color photoresist and an overcoat (OC) layer. Among them, the RGB color photoresist includes red, green and blue colored layers. In order to ensure the color uniformity of the color filter substrate and prevent light leakage, there is an overlap having a certain width between the RGB color photoresist and the BM. Usually, the width is 3 μm or more, and the height of the RGB color photoresist in the overlap region is higher than that in other regions, resulting in a large angular segment difference. In order to eliminate the angular segment difference, it is required to coating an OC material on the surface of the RGB color photoresist to ensure the surface flatness of the CF, thereby ensuring the uniformity of the rubbing in the alignment layer (PI) formed on the color filter substrate, and thus achieving a high picture quality. In addition, the OC layer may be also used as a protective layer to prevent small molecular substances in the colored layer from migrating to the liquid crystal layer, contaminating the liquid crystal and resulting in an uneven chromaticity.

In the practical application in the field of TFT-LCD, the basic physical properties of the OC material have a great influence on the molding process and the related defects thereof. For example, the oven pin mura may be improved by increasing the crosslinking degree of the OC material and reducing the flow of the OC coating layer in the oven process; and the flatness, surface tension and the like may be controlled and the VAS Time (vacuum align system) may be reduced by changing the type of the OC material and improving the hygroscopicity of the OC material. In addition, the hygroscopicity of the OC material has a great influence on the tact time of OC process and product quality such as peripheral bubbles, mura in the color of frame, and VAS time.

At present, the OC material mainly consists of acrylic resin-epoxy resin as a basic skeleton component, and an OC raw material available for a coating process may be obtained by adding a crosslinking agent, a surface modifier, a solvent, and the like. As one of the main skeleton components, acrylic resin exhibits high optical properties, but there is room for improvement in hygroscopicity and dielectric properties. At present, the most commonly used acrylic resin is polymethyl methacrylate.

SUMMARY

An object of the present disclosure is to provide a composition for an overcoat layer and a preparation method for the same, in which an overcoat layer material formed by crosslinking and curing the composition has excellent dielectric properties, low density, and low water absorption.

To achieve the above object, an aspect of the present disclosure provides a composition for an overcoat layer which comprises:
  10 to 30% by weight of styrene;
  10 to 30% by weight of an epoxy resin;
  1 to 3% by weight of a crosslinking agent;
  0.1 to 0.5% by weight of a photoinitiator and/or a thermal initiator;
  1 to 3% by weight of a surfactant; and
  40 to 77% by weight of a solvent.

In one embodiment, the composition for the overcoat layer further comprises (meth)acrylate, in which a total amount of (meth)acrylate and styrene is 10 to 30% by weight.

Typically, a mass ratio of (meth)acrylate to styrene is 1:(1 to 5).

In one embodiment, the crosslinking agent is divinylbenzene.

In one embodiment, the surfactant is one or more selected from the group consisting of alcohol ether phosphate, polyoxyethylene (21) alkyl phenyl ether, and polyoxyethylene (20) castor oil ether.

In one embodiment, the solvent is one or more selected from the group consisting of propylene glycol methyl ether acetate, ethylene glycol dimethyl ether, and diethylene glycol dimethyl ether.

In one embodiment, the thermal initiator is one or more selected from the group consisting of dibenzoyl peroxide, N,N-dimethylaniline and azobisisobutyronitrile.

In one embodiment, the photoinitiator is one or more selected from the group consisting of diphenylethanone, α,α-dimethoxy-α-phenylacetophenone, α,α-diethoxyacetophenone, α-hydroxyalkylphenone, benzophenone, and 2,4-dihydroxybenzophenone.

Another aspect of the present disclosure provides a preparation method of a composition for an overcoat layer which includes: mixing 10 to 30% by weight of styrene, 10 to 30% by weight of an epoxy resin, 1 to 3% by weight of a crosslinking agent, 0.1 to 0.5% by weight of a photoinitiator and/or a thermal initiator, 1 to 3% by weight of a surfactant, and 40 to 77% by weight of a solvent, to obtain the composition for the overcoat layer.

In an embodiment, the preparation method includes:
  S1-1: mixing 10 to 30% by weight of styrene and the crosslinking agent and making then react with each other to obtain a polystyrene prepolymer, and
  S1-2: mixing the polystyrene prepolymer with 10 to 30% by weight of the epoxy resin, the crosslinking agent, 0.1 to 0.5% by weight of the photoinitiator and/or the thermal initiator, 1 to 3% by weight of the surfactant, and 40 to 77% by weight of the solvent, to obtain the composition for the overcoat layer, in step S1-1 and step S1-2, the crosslinking agent is added in a total amount of 1 to 3% by weight.

In another embodiment, the preparation method includes:

S2-1: mixing 10 to 30% by weight of styrene, the crosslinking agent and the thermal initiator and making them react with each other to obtain a polystyrene prepolymer, and S2-2: mixing the polystyrene prepolymer with 10 to 30% by weight of the epoxy resin, the crosslinking agent, the photoinitiator and/or the thermal initiator, 1 to 3% by weight of the surfactant, and 40 to 77% by weight of the solvent, to obtain the composition for the overcoat layer, in step S2-1 and step S2-2, the crosslinking agent are added in a total amount of 1 to 3% by weight, and in step S2-1 and step S2-2, the thermal initiator and the photoinitiator are added in a total amount of 0.1 to 0.5% by weight.

In one embodiment, (meth)acrylate is further added when the epoxy resin is added, and a total amount of (meth)acrylate and styrene is 10 to 30% by weight.

Another aspect of the present disclosure provides an overcoat layer material which is obtained by crosslinking and curing the above composition for an overcoat layer.

In one embodiment, the crosslinking and curing is carried out by means of heating and/or ultraviolet irradiation, and a heating temperature is in the range of 150 to 250° C., a heating time is in the range of 5 to 15 min, and an ultraviolet irradiation time is in the range of 5 to 10 min.

Another aspect of the present disclosure provides a display substrate, the overcoat layer material used in the display substrate is obtained by crosslinking and curing the above composition for an overcoat layer.

Another aspect of the present disclosure provides a display device including the above display substrate.

DETAILED DESCRIPTION

Figure 1:
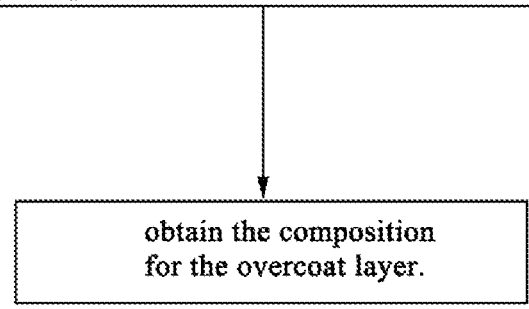
FIG. 1 is a flow chart for preparing a composition for an overcoat layer according to one embodiment of the present disclosure.

In order to better understand the present disclosure, the specific embodiments of the present disclosure will be described below in combination with drawings, but it should be understood that these descriptions are merely used to further illustrate the features and advantages of the present disclosure and are not intended to limit the present disclosure.

An embodiment of the present disclosure provides a composition for an overcoat layer, including the following components:

10 to 30% by weight of styrene;
10 to 30% by weight of an epoxy resin;
1 to 3% by weight of a crosslinking agent;
0.1 to 0.5% by weight of a photoinitiator and/or a thermal initiator;
1 to 3% by weight of a surfactant; and
40 to 77% by weight of a solvent.

In an embodiment, the composition for the overcoat layer includes: styrene, epoxy resin, a crosslinking agent, a photoinitiator and/or a thermal initiator, a surfactant, and a solvent. The composition for the overcoat layer has styrene as a main monomer component, therefore, the composition for the overcoat layer of this embodiment is cured to obtain an overcoat layer material having a crosslinked polystyrene skeleton as a main structure.

In an embodiment, the content of the styrene is in the range of 10 to 30% by weight. In one embodiment, the content of the styrene may be in the range of 10 to 15% by weight. In another embodiment, the content of the styrene may be in the range of 15 to 25% by weight. In another embodiment, the content of the styrene may be also in the range of 25 to 30% by weight. The higher the styrene content, the greater the effect on the dielectric properties, density, and water absorption of the overcoat layer material, and the better the performance of the overcoat layer material in all aspects.

Further, in one embodiment, the composition for the overcoat layer may further include (meth)acrylate. The (meth)acrylate may be methyl (meth)acrylate, methyl acrylate, ethyl acrylate or the like. When the composition for the overcoat layer further include (meth)acrylate, a total amount of the (meth)acrylate and styrene is in the range of 10 to 30% by weight. Typically, a mass ratio of (meth)acrylate to styrene may be 1:(1 to 5). For the composition for the overcoat layer of the present disclosure, the object of the present disclosure may also be achieved by partially replacing the conventional (meth)acrylate monomer with styrene monomer.

In an embodiment, the composition for the overcoat layer includes 1 to 3% by weight of a crosslinking agent. In one embodiment, the composition for the overcoat layer may include 1.5 to 2.5% by weight of a crosslinking agent. The crosslinking agent may react with styrene to form a crosslinked skeleton. Further, if the crosslinking agent is in the range of the above content, styrene may be formed into a better crosslinking network. The crosslinking agent may be divinylbenzene.

In an embodiment, the composition for the overcoat layer includes 1 to 3% by weight of a surfactant. In one embodiment, the composition for the overcoat layer may include 1.5 to 2.5% by weight of a surfactant. The surfactant may be one or more selected from the group consisting of alcohol ether phosphate, polyoxyethylene (21) alkyl phenyl ether, and polyoxyethylene (20) castor oil ether.

In an embodiment, the composition for the overcoat layer includes: 40 to 77% by weight of a solvent. The solvent may be one or more selected from the group consisting of propylene glycol methyl ether acetate, ethylene glycol dimethyl ether, and diethylene glycol dimethyl ether.

In an embodiment, the composition for the overcoat layer includes 0.1 to 0.5% by weight of a photoinitiator and/or a thermal initiator. In an embodiment, a photoinitiator may be added alone, or a thermal initiator may be added alone, or a photoinitiator and a thermal initiator may be added simultaneously.

The thermal initiator may be one or more selected from a group consisting of dibenzoyl peroxide, N,N-dimethylaniline and azobisisobutyronitrile. The photoinitiator may be one or more selected from the group consisting of diphenylethanone, α,α-dimethoxy-α-phenylacetophenone, α,α-diethoxyacetophenone, α-hydroxyalkylphenone, benzophenone, and 2,4-dihydroxybenzophenone.

According to another embodiment of the present disclosure, referring to FIG. 1, provided is a preparation method of a composition for an overcoat layer, including the following steps of mixing 10 to 30% by weight of styrene, 10 to 30% by weight of an epoxy resin, 1 to 3% by weight of a crosslinking agent, 0.1 to 0.5% by weight of a photoinitiator and/or a thermal initiator, 1 to 3% by weight of a surfactant, and 40 to 77% by weight of a solvent, to obtain the composition for the overcoat layer.

In an embodiment, after the components are uniformly mixed, the composition for the overcoat layer may be obtained. The composition for the overcoat layer may be coated directly to the surface of other coatings, and then cured to form an overcoat layer.

Figure 2:
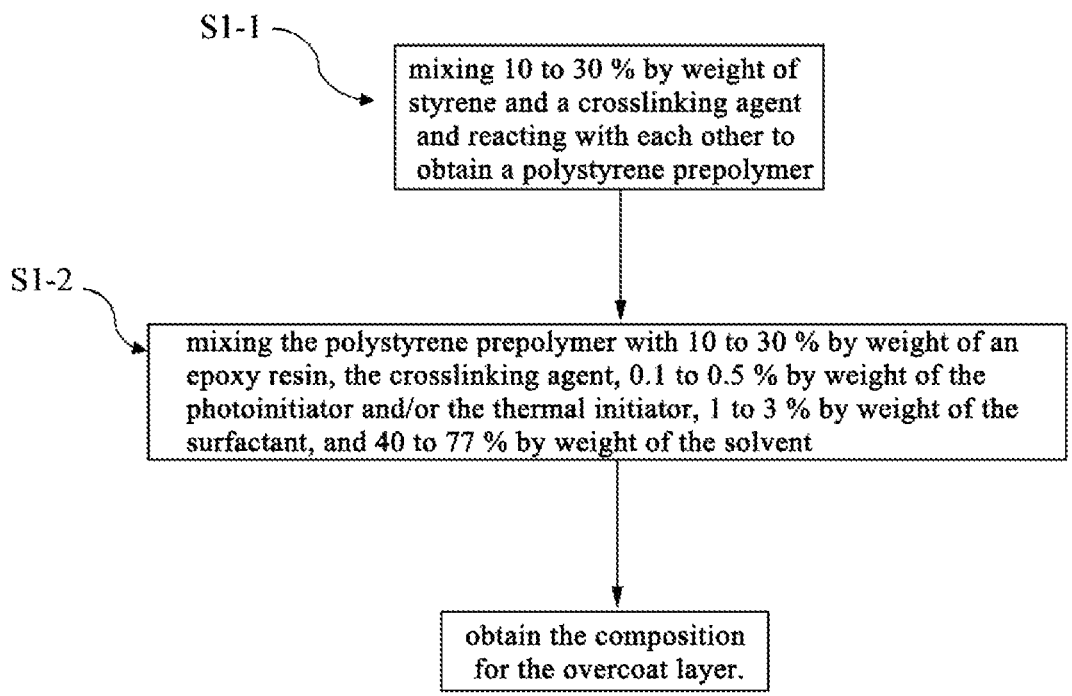
FIG. 2 is a flow chart for preparing a composition for overcoat layer according to another embodiment of the present disclosure.

Referring to FIG. 2, in one embodiment, the method may include the following steps of:

S1-1: mixing 10 to 30% by weight of styrene and a crosslinking agent and making them react with each other to obtain a polystyrene prepolymer, and S1-2: mixing the polystyrene prepolymer with 10 to 30% by weight of an epoxy resin, the crosslinking agent, 0.1 to 0.5% by weight of the photoinitiator and/or the thermal initiator, 1 to 3% by weight of the surfactant, and 40 to 77% by weight of the solvent, to obtain the composition for the overcoat layer, in step S1-1 and step S1-2, the crosslinking agent is added in a total amount of 1 to 3% by weight.

In step S1-1, styrene is first mixed with a part of the crosslinking agent and reacts with the part of the crosslinking agent to obtain a polystyrene prepolymer. Upon reaction, the monomer of styrene polymerizes to form a polymer. The reaction time may be in the range of 0.5 to 1 hour.

Next, after the polystyrene prepolymer is obtained, in step S1-2, the polystyrene prepolymer is mixed with the epoxy resin, another part of the crosslinking agent, the photoinitiator and/or the thermal initiator, surfactant and the solvent, to obtain a composition for an overcoat layer.

In step S1-1 and step S1-2, the crosslinking agent is added in a total amount of 1 to 3% by weight.

The polymer which is obtained by curing the composition for the overcoat layer prepared by the preparation method of the present embodiment has a structure with a longer polymer chain and a better degree of crosslinking.

In another embodiment, the method may include the following steps of:

S2-1: mixing 10 to 30% by weight of styrene, the crosslinking agent and the thermal initiator to obtain a polystyrene prepolymer, and S2-2: mixing the polystyrene prepolymer with 10 to 30% by weight of an epoxy resin, the crosslinking agent, the photoinitiator and/or the thermal initiator, 1 to 3% by weight of the surfactant, and 40 to 77% by weight of the solvent, to obtain the composition for the overcoat layer, in step S1-1 and step S1-2, the crosslinking agent is added in a total amount of 1 to 3% by weight, and the photoinitiator and the thermal initiator are added in a total amount of 0.1 to 0.5% by weight.

In step S2-1 of the present embodiment, a better reaction between styrene and the crosslinking agent is facilitated by adding the thermal initiator, to obtain the polystyrene prepolymer. In step S2-2 of the present embodiment, a thermal initiator may be further added, or a photoinitiator may be added, or a photoinitiator and a thermal initiator may be simultaneously added. However, in view of the simplicity of the subsequent curing step, generally only one initiator (a photoinitiator or a thermal initiator) is added in step S2-2.

In step S2-1 and step S2-2 of the present embodiment, the crosslinking agent is added in a total amount of 1 to 3% by weight. In addition, in step S2-1 and step S2-2 of the present embodiment, the photoinitiator and the thermal initiator are added in a total amount of 0.1 to 0.5% by weight. That is, when the thermal initiator is added in both step S2-1 and step S2-2, the thermal initiator is added in a total amount of 0.1 to 0.5% by weight; and when the thermal initiator is added in step S2-1 and a photoinitiator is added in step S2-2, the thermal initiator and the photoinitiator are added in a total amount of 0.1 to 0.5% by weight.

In an embodiment, (meth)acrylate may be further added when the epoxy resin is added, and (meth)acrylate and styrene is added in a total amount of 10 to 30% by weight.

In an embodiment, the preparation method of a composition for an overcoat layer, including the following steps of:

S3-1: mixing styrene and a crosslinking agent and making them react with each other to obtain a polystyrene prepolymer, and S3-2: mixing the polystyrene prepolymer with 10 to 30% by weight of an epoxy resin, the crosslinking agent, (meth)acrylate, 0.1 to 0.5% by weight of the photoinitiator and/or the thermal initiator, 1 to 3% by weight of the surfactant, and 40 to 77% by weight of the solvent, to obtain the composition for the overcoat layer, in step S3-1 and step S3-2, the crosslinking agent is added in a total amount of 1 to 3% by weight, and (meth)acrylate and styrene is added in a total amount of 10 to 30% by weight.

Alternatively, the preparation method of a composition for an overcoat layer, including the following steps of:

S4-1: mixing styrene, a thermal initiator and a crosslinking agent and making them react with each other to obtain a polystyrene prepolymer, and S4-2: mixing the polystyrene prepolymer with 10 to 30% by weight of an epoxy resin, the crosslinking agent, (meth)acrylate, the photoinitiator and/or the thermal initiator, 1 to 3% by weight of the surfactant, and 40 to 77% by weight of the solvent, to obtain the composition for the overcoat layer.

In step S4-1, a better reaction between styrene and a crosslinking agent is facilitated by adding a thermal initiator, to obtain a polystyrene prepolymer. In step S4-1 and step S4-2, the crosslinking agent is added in a total amount of 1 to 3% by weight, and the total amount of the (meth)acrylate and styrene is in the range of 10 to 30% by weight. In addition, in step S4-1 and step S4-2, the photoinitiator and the thermal initiator are added in a total amount of 0.1 to 0.5% by weight. That is, when the thermal initiator is added in both step S4-1 and step S4-2, the thermal initiator is added in a total amount of 0.1 to 0.5% by weight; and when the thermal initiator is added in step S4-1 and a photoinitiator is added in step S4-2, the thermal initiator and the photoinitiator are added in a total amount of 0.1 to 0.5% by weight.

According to another embodiment of the present disclosure, provided is an overcoat layer material which is obtained by crosslinking and curing the above composition for an overcoat layer in the above embodiments.

That is, the overcoat layer material is obtained by crosslinking and curing the composition for the overcoat layer, including the following components:

10 to 30% by weight of styrene;
10 to 30% by weight of an epoxy resin;
1 to 3% by weight of a crosslinking agent;
0.1 to 0.5% by weight of a photoinitiator and/or a thermal initiator;
1 to 3% by weight of a surfactant; and
40 to 77% by weight of a solvent.

In this embodiment, under the action of a photoinitiator and/or a thermal initiator, styrene and a crosslinking agent undergo a polymerization reaction and a crosslinking reaction to achieve curing, thereby obtaining an overcoat layer material.

An overcoat layer may be obtained by coating and curing the composition for the overcoat layer.

In an embodiment, the crosslinking and curing is carried out by means of heating and/or ultraviolet irradiation (hereinafter, sometimes referred to as "UV light"), and a heating temperature is in the range of 150 to 250° C., a heating time is in the range of 5 to 15 min, and an ultraviolet irradiation time is in the range of 5 to 10 min.

According to another aspect of the present disclosure, further provided is a display substrate, which comprises an overcoat layer obtained by crosslinking and curing the above composition for an overcoat layer in the above embodiments.

According another aspect of the present disclosure, provided is a display device including the above display substrate.

In order to further understand the present disclosure, the composition for the overcoat layer, the preparation method for the same, the overcoat layer material, and the display substrate provided by the present disclosure will be described in detail in the following examples, but the protection scope of the present disclosure is not limited by the following examples.

In each of the examples, the water absorption rate was measured according to the method described in GB/T 1034-2008 for plastics—determination of water absorption; the dielectric constant and dielectric loss were measured according to the method described in GB/T 1409-2006 for the recommended methods for the determination of the permittivity and dielectric dissipation factor of electrical insulating materials at power, audio, and high frequencies; and the volume resistivity is measured according to the method described in GB/T 1410-2006 methods of test for volume resistivity and surface resistivity of solid electrical insulating materials.

Example 1

The component and the content (the total amount is 100%) of the composition for the overcoat layer of this example are shown as follows:

Component 1: styrene and acrylate, accounting for 30% by weight, in which the ratio of styrene to (meth)acrylate is 1:5, and the (meth)acrylate is methyl (meth)acrylate;

Component 2: an epoxy resin, accounting for 10% by weight;

Component 3: divinylbenzene, accounting for 1% by weight;

Component 4: alcohol ether phosphate, accounting for 1% by weight;

Component 5: dibenzoyl peroxide, accounting for 0.1% by weight;

Component 6: propylene glycol methyl ether acetate, accounting for 57.9% by weight.

The preparation method of the composition for the overcoat layer of this example is shown as follows: the above components were uniformly mixed to obtain the composition for the overcoat layer. The composition for the overcoat layer was coated, and further cured at a temperature of 150 to 250° C. for 15 to 30 min to complete the curing, thereby obtaining an overcoat layer material.

The physical properties of the overcoat layer material prepared in Example 1 were tested and compared with those of the existing overcoat layer material. The parameters of the physical properties are shown in detail in Table 1.

TABLE 1

| Parameters of Physical Properties | Overcoat Layer Material Prepared in Example 1 | Existing Overcoat Layer Material |
|---|---|---|
| Density (g/cm$^3$) | 1.05 to 1.1 | 1.2 to 1.3 |
| Dielectric Constant | 2.5 to 3 | 3 to 4 |
| Dielectric Loss | around $10^{-3}$ | around $10^{-2}$ |
| Water Absorption Rate (%) | $<10^{-3}$ | $<10^{-1}$ |
| Volume Resistivity (Ω · cm) | $>10^{16}$ | $>10^{16}$ |

Example 2

The component and the content (the total amount is 100%) of the composition for the overcoat layer of this example are shown as follows:

Component 1: styrene, accounting for 10% by weight;

Component 2: epoxy resin, accounting for 30% by weight;

Component 3: divinylbenzene, accounting for 1.5% by weight;

Component 4: polyoxyethylene (21) alkyl phenyl ether, accounting for 3% by weight;

Component 5: N,N-dimethylaniline, accounting for 0.3% by weight;

Component 6: ethylene glycol dimethyl ether, accounting for 55.2% by weight.

The preparation method of the composition for the overcoat layer of this example is shown as follows: the above components were uniformly mixed to obtain the composition for the overcoat layer. The composition for the overcoat layer was coated, and further cured at a temperature of 150 to 250° C. for 15 to 30 min to complete the curing, thereby obtaining an overcoat layer material.

Example 3

The component and the content (the total amount is 100%) of the composition for the overcoat layer of this example are shown as follows:

Component 1: styrene and (meth)acrylate, accounting for 20% by weight, in which the ratio of styrene to (meth)acrylate is 1:1, and the (meth)acrylate is methyl (meth)acrylate;

Component 2: an epoxy resin, accounting for 20% by weight;

Component 3: divinylbenzene, accounting for 2% by weight;

Component 4: polyoxyethylene (20) castor oil ether, accounting for 2% by weight;

Component 5: diphenylethanone, accounting for 0.5% by weight;

Component 6: diethylene glycol dimethyl ether, accounting for 55.5% by weight.

The preparation method of the composition for the overcoat layer of this example is shown as follows: the above components were uniformly mixed to obtain the composition for the overcoat layer. The composition for the overcoat layer was coated, further irradiated with UV light (with a wavelength of 300 to 400 nm) for 5 to 10 min, and then cured at a temperature of 150 to 250° C. for 5 to 15 min to complete curing, thereby obtaining an overcoat layer material.

Example 4

The component and the content (the total amount is 100%) of the composition for the overcoat layer of this example are shown as follows:

Component 1: styrene, accounting for 25% by weight;

Component 2: epoxy resin, accounting for 25% by weight;

Component 3: divinylbenzene, accounting for 3% by weight;

Component 4: alcohol ether phosphate, accounting for 3% by weight;

Component 5: α,α-dimethoxy-α-phenylacetophenone, accounting for 0.5% by weight;

Component 6: ethylene glycol dimethyl ether, accounting for 43.5% by weight.

The preparation method of the composition for the overcoat layer of this example is shown as follows: the above components were uniformly mixed to obtain the composition for the overcoat layer. The composition for the overcoat layer was coated, further irradiated with UV light (with a wavelength of 300 to 400 nm) for 5 to 10 min, and then cured at a temperature of 150 to 250° C. for 5 to 15 min to complete curing, thereby obtaining an overcoat layer material.

Example 5

The component and the content (the total amount is 100%) of the composition for the overcoat layer of this example are shown as follows:

Component 1: styrene and (meth)acrylate, accounting for 30% by weight, in which the ratio of styrene to (meth)acrylate is 1:5, and the (meth)acrylate is methyl (meth)acrylate;

Component 2: epoxy resin, accounting for 10% by weight;

Component 3: divinylbenzene, accounting for 2.5% by weight;

Component 4: alcohol ether phosphate, accounting for 1% by weight;

Component 5: dibenzoyl peroxide, accounting for 0.1% by weight;

Component 6: propylene glycol methyl ether acetate, accounting for 56.4% by weight.

The preparation method of the composition for the overcoat layer of this example is shown as follows:

mixing 30% by weight of a mixture of styrene and (meth)acrylate, 0.02% by weight of dibenzoyl peroxide and 1% by weight of divinylbenzene and making them react with each other to obtain a polystyrene prepolymer; and mixing the polystyrene prepolymer with 10% by weight of epoxy resin, 1.5% by weight of divinylbenzene, 0.08% by weight of dibenzoyl peroxide, 1% by weight of alcohol ether phosphate, and 57.9% by weight of propylene glycol methyl ether acetate to obtain the composition for the overcoat layer.

The above composition for an overcoat layer was coated, and further cured at a temperature of 150 to 250° C. for 15 to 30 min to complete the curing, thereby obtaining an overcoat layer material.

Example 6

The component and the content (the total amount is 100%) of the composition for the overcoat layer of this example are shown as follows:

Component 1: styrene, accounting for 25% by weight;

Component 2: epoxy resin, accounting for 25% by weight;

Component 3: divinylbenzene, accounting for 3% by weight;

Component 4: alcohol ether phosphate, accounting for 3% by weight;

Component 5: α,α-dimethoxy-α-phenylacetophenone, accounting for 0.5% by weight;

Component 6: ethylene glycol dimethyl ether, accounting for 43.5% by weight.

The preparation method of the composition for the overcoat layer of this example is shown as follows:

mixing 25% by weight of styrene with 0.75% by weight of divinylbenzene and making them react with each other to obtain a polystyrene prepolymer; and mixing the polystyrene prepolymer with 25% by weight of epoxy resin, 2.25% by weight of divinylbenzene, 0.1% by weight of dibenzoyl peroxide, 3% by weight of alcohol ether phosphate, and 43.5% by weight of ethylene glycol dimethyl ether, thereby obtaining the composition for the overcoat layer.

The above composition for an overcoat layer was coated, further irradiated with UV light (wavelength 300 to 400 nm) for 5 to 10 min, and then cured at a temperature of 150 to 250° C. for 5 to 15 min to complete curing, thereby obtaining an overcoat layer material.

The physical properties of the overcoat layer material prepared in Example 6 were tested and compared with those of the existing overcoat layer material. The parameters of the physical properties are shown in detail in Table 2.

TABLE 2

| Parameters of Physical Properties | Overcoat Layer Material Prepared in Example 6 | Existing Overcoat Layer Material |
|---|---|---|
| Density (g/cm$^3$) | 1.00 to 1.05 | 1.2 to 1.3 |
| Dielectric Constant | 2.4 to 2.5 | 3 to 4 |
| Dielectric Loss | around $10^{-3}$ | around $10^{-2}$ |
| Water Absorption Rate (%) | <$10^{-3}$ | <$10^{-1}$ |
| Volume Resistivity (Ω · cm) | >$10^{16}$ | >$10^{16}$ |

In addition, the present disclosure also investigates the properties of crosslinked polystyrene, and compares it with the performance of existing polymethyl methacrylate. As a result, it has been found that polystyrene is very suitable for being added to the overcoat layer material. The experimental data for the parameters of the physical properties are shown in detail in Table 3.

TABLE 3

| Parameters of Physical Properties | Crosslinked Polystyrene | Polymethyl Methacrylate |
|---|---|---|
| Monomer Density (g/cm$^2$) | 0.88 | 0.94 |
| Density | around 1.05 | 1.15 to 1.19 |
| Curing Shrinkage Rate (%) (calculated from density) | 16.2% | 18.2% to 21.1% |
| Transmittance (%) | 88 to 90 | 90 to 92 |
| Dielectric Constant | around 2.53 (1M to 50G) | 3.3 to 3.9 |

TABLE 3-continued

| Parameters of Physical Properties | Crosslinked Polystyrene | Polymethyl Methacrylate |
|---|---|---|
| Dielectric Loss | around $10^{-3}$ | 0.04 to 0.06 |
| Water Absorption Rate (%) | 0.0008 | <0.5 |
| Thermal Expansion Coefficient (/K) | 6.84*$10^5$ | — |
| Application Temperature (° C.) | −60 to 100 | around 100 |
| Volume Resistivity (Ω · cm) | >$10^{16}$ | >$10^{14}$ |
| Molecular Polarity | no (weak) polarity | weak polarity |

According to the above Examples, the composition for the overcoat layer of the present disclosure includes the following components: 10 to 30% by weight of styrene, 10 to 30% by weight of an epoxy resin, 1 to 3% by weight of a crosslinking agent, 0.1 to 0.5% by weight of a photoinitiator and/or a thermal initiator, 1 to 3% by weight of a surfactant, and 40 to 77% by weight of a solvent. Compared with the prior art, the composition for the overcoat layer of the present disclosure has styrene as a main monomer component, and may be cured by initiation of a photoinitiator and/or a thermal initiator, thereby obtaining a mixture of a crosslinked polystyrene and epoxy resin, i.e., the overcoat layer material. The overcoat layer material of this composition has physical properties such as more excellent dielectric properties, lower density, lower water absorption, and high electrical stability. The experimental results show that the density of the overcoat layer material obtained by the present invention (g/cm$^3$) is 1.05 to 1.1; the dielectric constant is 2.5 to 3; the dielectric loss is around $10^{-3}$; the water absorption rate (%) is <$10^{-3}$; and volume resistivity (Ω·cm)>$10^{16}$.

The above Examples are merely used for helping to understand the method according to the present disclosure and its inventive concept. It should be noted that a person skilled in the art may make further improvements and modifications to the disclosure without departing from the principle/spirit of the present disclosure, and these improvements and modifications shall also fall within the scope of the present disclosure.

What is claimed is:

1. A composition for an overcoat layer, comprising:
10 to 30% by weight of styrene and (meth)acrylate;
10 to 30% by weight of an epoxy resin;
1 to 3% by weight of a crosslinking agent;
0.1 to 0.5% by weight of a photoinitiator and/or a thermal initiator;
1 to 3% by weight of a surfactant; and
40 to 77% by weight of a solvent,
wherein a mass ratio of (meth)acrylate to styrene is 1:(1 to 5), and the crosslinking agent is divinylbenzene.

2. The composition for the overcoat layer of claim 1, wherein the surfactant is one or more selected from the group consisting of alcohol ether phosphate, polyoxyethylene (21) alkyl phenyl ether, and polyoxyethylene (20) castor oil ether.

3. The composition for the overcoat layer of claim 1, wherein the solvent is one or more selected from the group consisting of propylene glycol methyl ether acetate, ethylene glycol dimethyl ether, and diethylene glycol dimethyl ether.

4. The composition for the overcoat layer of claim 1, wherein the thermal initiator is one or more selected from the group consisting of dibenzoyl peroxide and azobisisobutyronitrile.

5. The composition for the overcoat layer of claim 1, wherein the photoinitiator is one or more selected from the group consisting of diphenylethanone, α,α-dimethoxy-α-phenylacetophenone, α,α-diethoxyacetophenone, α-hydroxyalkylphenone, benzophenone, and 2,4-dihydroxybenzophenone.

6. A method of preparing a composition for an overcoat layer, comprising:
mixing 10 to 30% by weight of styrene and (meth)acrylate, 10 to 30% by weight of an epoxy resin, 1 to 3% by weight of a crosslinking agent, 0.1 to 0.5% by weight of a photoinitiator and/or a thermal initiator, 1 to 3% by weight of a surfactant, and 40 to 77% by weight of a solvent, to obtain the composition for the overcoat layer,
wherein a mass ratio of (meth)acrylate to styrene is 1:(1 to 5), and the crosslinking agent is divinylbenzene.

7. The method of claim 6, wherein the preparation method comprises:
S3-1: mixing styrene and the crosslinking agent and making them react with each other to obtain a polystyrene prepolymer, and
S3-2: mixing the polystyrene prepolymer with 10 to 30% by weight of the epoxy resin, the crosslinking agent, (meth)acrylate, 0.1 to 0.5% by weight of the photoinitiator and/or the thermal initiator, 1 to 3% by weight of the surfactant, and 40 to 77% by weight of the solvent, to obtain the composition for the overcoat layer,
in step S3-1 and step S3-2, the crosslinking agent is added in a total amount of 1 to 3% by weight.

8. The method of claim 6, wherein the preparation method comprises:
S4-1: mixing styrene, the crosslinking agent and the thermal initiator and making them react with each other to obtain a polystyrene prepolymer, and
S4-2: mixing the polystyrene prepolymer with 10 to 30% by weight of the epoxy resin, the crosslinking agent, (meth)acrylate, the photoinitiator and/or the thermal initiator, 1 to 3% by weight of the surfactant, and 40 to 77% by weight of the solvent, to obtain the composition for the overcoat layer,
in step S4-1 and step S4-2, the crosslinking agent is added in a total amount of 1 to 3% by weight, and
in step S4-1 and step S4-2, the thermal initiator and the photoinitiator are added in a total amount of 0.1 to 0.5% by weight.

9. An overcoat layer material which is obtained by crosslinking and curing the composition for the overcoat layer of claim 1.

10. The overcoat layer material of claim 9, wherein the crosslinking and curing is carried out by means of heating and/or ultraviolet irradiation, and wherein a heating temperature is in the range of 150 to 250° C., a heating time is in the range of 5 to 15 min, and an ultraviolet irradiation time is in the range of 5 to 10 min.

11. A display substrate, comprising an overcoat layer obtained by crosslinking and curing the composition for the overcoat layer of claim 1.

12. A display device, comprising the display substrate of claim 11.

13. The overcoat layer material of claim 9, wherein the surfactant is one or more selected from the group consisting of alcohol ether phosphate, polyoxyethylene (21) alkyl phenyl ether, and polyoxyethylene (20) castor oil ether.

14. The overcoat layer material of claim 9, wherein the solvent is one or more selected from the group consisting of propylene glycol methyl ether acetate, ethylene glycol dimethyl ether, and diethylene glycol dimethyl ether.

15. The overcoat layer material of claim 9, wherein the thermal initiator is one or more selected from the group consisting of dibenzoyl peroxide and azobisisobutyronitrile.

16. The overcoat layer material of claim 9, wherein the photoinitiator is one or more selected from the group consisting of diphenylethanone, α,α-dimethoxy-α-phenylacetophenone, α,α-diethoxyacetophenone, α-hydroxyalkylphenone, benzophenone, and 2,4-dibydroxybenzophenone.

17. The display substrate of claim 11, wherein the surfactant is one or more selected from the group consisting of alcohol ether phosphate, polyoxyethylene (21) alkyl phenyl ether, and polyoxyethylene (20) castor oil ether.

18. The display substrate of claim 11, wherein the solvent is one or more selected from the group consisting of propylene glycol methyl ether acetate, ethylene glycol dimethyl ether, and diethylene glycol dimethyl ether.

19. The display substrate of claim 11, wherein the thermal initiator is one or more selected from the group consisting of dibenzoyl peroxide and azobisisobutyronitrile.

20. The display substrate of claim 11, wherein the photoinitiator is one or more selected from the group consisting of diphenylethanone, α,α-dimethoxy-α-phenylacetophenone, α,α-diethoxyacetophenone, α-hydroxyalkylphenone, benzophenone, and 2,4-dihydroxybenzophenone.

* * * * *